United States Patent [19]

Hattori

[11] Patent Number: 4,696,366
[45] Date of Patent: Sep. 29, 1987

[54] MOTORCYCLE

[75] Inventor: Shigeru Hattori, Tokyo, Japan

[73] Assignee: Honda Giken Kogyo Kabushiki Kaisha, Tokyo, Japan

[21] Appl. No.: 815,109

[22] Filed: Dec. 31, 1985

[30] Foreign Application Priority Data

Jan. 11, 1985 [JP] Japan ................................ 60-2163

[51] Int. Cl.⁴ ............................................. B60K 13/04
[52] U.S. Cl. .................................. 180/296; 180/89.2; 180/309; 180/314; D12/110; D12/126
[58] Field of Search .............. 180/309, 219, 225, 314, 180/296, 89.2; 280/281 R, 281 LP, 281 B, 5 H, 5 A; D12/107, 108, 109, 110, 114, 117, 126

[56] References Cited

FOREIGN PATENT DOCUMENTS

| 1118632 | 11/1961 | Fed. Rep. of Germany ...... 180/225 |
| 429921 | 2/1948 | Italy ..................................... 180/225 |
| 89423 | 5/1983 | Japan ................................... 180/89.2 |

Primary Examiner—John J. Love
Assistant Examiner—Eric Culbreth
Attorney, Agent, or Firm—Armstrong, Nikaido Marmelstein Kubovcik

[57] ABSTRACT

In a motorcycle, a fuel tank is mounted to a main frame extending from a head pipe to the rear of a vehicle body in such mode that the fuel tank can be mounted from and dismounted to the side of the vehicle body, and an exhaust pipe is disposed along the main frame at the same level as the fuel tank.

1 Claim, 9 Drawing Figures

MOTORCYCLE

BACKGROUND OF THE INVENTION

1. Field of the Invention

The present invention relates in general to a motorcycle, and more particularly to a relative arrangement of a fuel tank and an exhaust pipe in a motorcycle.

2. Description of the Prior Art

In a two-cycle engine, during a scavenging period the interior of an exhaust pipe is held at a negative pressure by an inertial effect of an exhaust gas within the exhaust pipe, thereby the exhaust gas is sucked to enhance scavenging efficiency. Provision is also made such that a positive pressure may be established at the position of an exhaust port just before the exhaust port is closed by making use of a reflection wave to push back fresh gas that is going to pass through. Improvement of an engine performance is thereby achieved.

The above-mentioned effect called "KADENACY-effect" can be realized by a special configuration of an exhaust pipe, and generally such configuration that the exhaust pipe expands gradually from its inlet, and after it has reached the maximum diameter, it contracts gradually, and is considerably narrowed at its outlet. FIGS. 1 to 3 show one example of a motorcycle equipped with the above-described exhaust pipe 01.

Exhaust pipe 01 has a predetermined length to provide the KADENACY-effect. For the purpose of effectively realizing the necessary length, it is bent with a large curvature from an exhaust inlet portion 02 connected to an exhaust port of an engine E, extends downwards, then extends in the widthwise direction of a vehicle body and, thereafter, extends to the rear of the vehicle body along the lower edge of one branch of a fuel tank 04 having a V-shaped cross-section which straddles a main frame 03. The exhaust pipe is connected to a muffler 05.

In the case where the exhaust pipe 01 is shaped and disposed in the above-described manner, the following disadvantages arise.

(1) There is a possibility that mud splashed by a front wheel is liable to adhere to the front end portion of the exhaust pipe, is positioned behind the front wheel.

(2) Taking into consideration the foot rest attitude of a rider, generally at the level lower than the fuel tank, a large diameter portion of the exhaust pipe 01 is positioned in front of the fuel tank.

(3) Consequently, in order to reasonably dispose the exhaust pipe 01 at a level lower than radiators 06, the sizes and mounting positions of the radiators 06 are restricted.

SUMMARY OF THE INVENTION

One object of the present invention is to make an exhaust pipe connected to an engine extend to a level as high as possible without causing any adverse effect upon other members and thereby assure a necessary length of the exhaust pipe.

The above-mentioned object of the present invention can be achieved by mounting a fuel tank to a main frame extending from a head pipe to the rear of a vehicle body in such mode that the fuel tank can be mounted from and dismounted to the side of the vehicle body, and by disposing The exhaust pipe along the main frame at the same level as the fuel tank.

If the above-described construction is employed, a freedom is increased in determination of a shape and a length of an exhaust pipe, and good vehicle maintenance facility can be assured by performing mounting and dismounting of a fuel tank in the widthwise direction of the vehicle.

DESCRIPTION OF THE PREFERRED EMBODIMENTS

In the following, description will be made on one preferred embodiment of the present invention illustrated in FIGS. 4 to 7.

Figure 1:
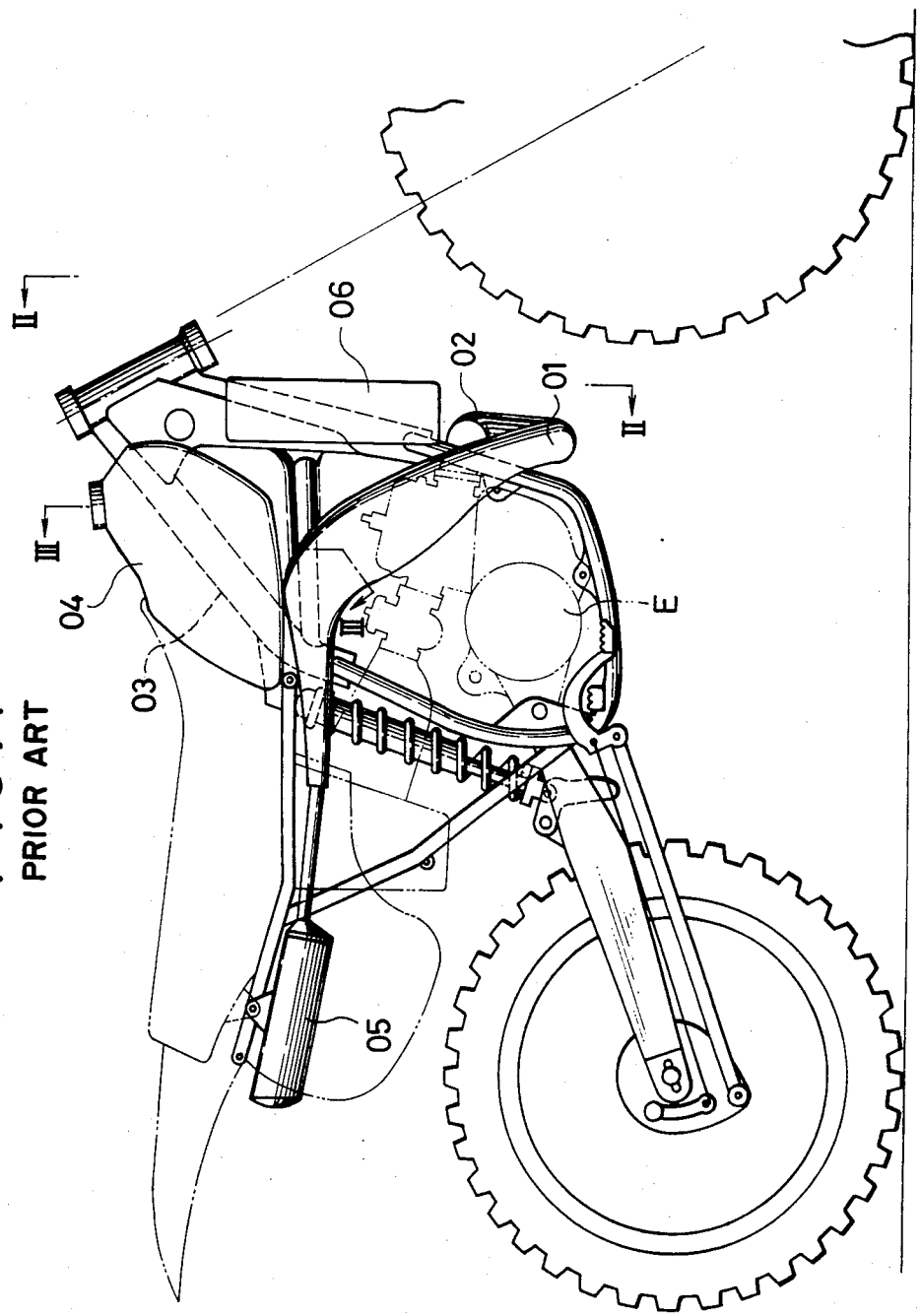
FIG. 1 is a schematic view of a motorcycle in the prior art.
Figure 2:
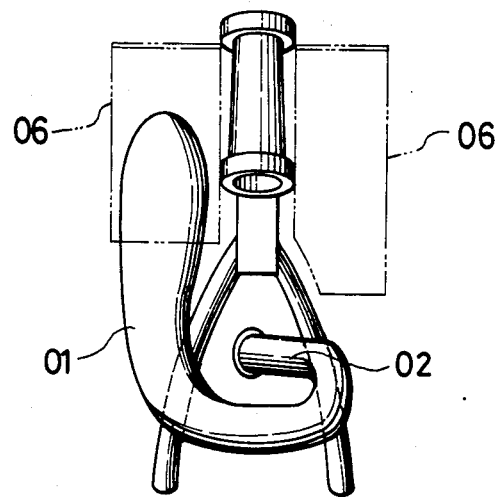
FIG. 2 is a schematic view of an essential part of the same motorcycle taken along line II—II in FIG. 1 as viewed in the direction of arrows.
Figure 3:
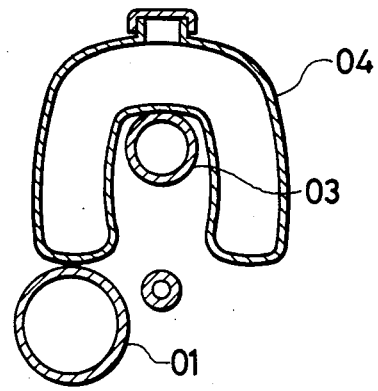
FIG. 3 is a schematic partial cross-section view taken along line III—III in FIG. 1 as viewed in the direction of arrows.
Figure 4:
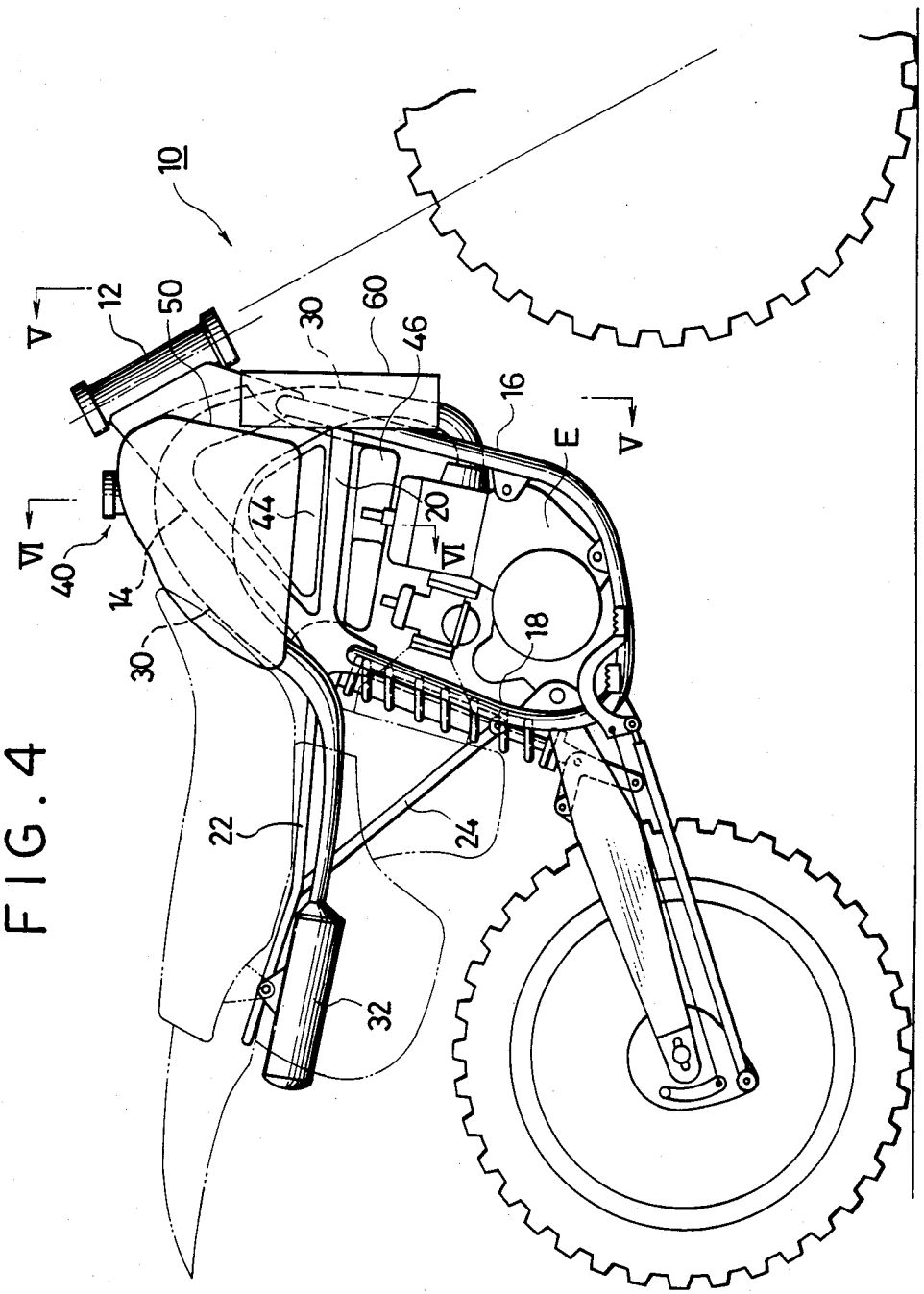
FIG. 4 is a schematic view of a motorcycle according to one preferred embodiment of the present invention.
Figure 5:
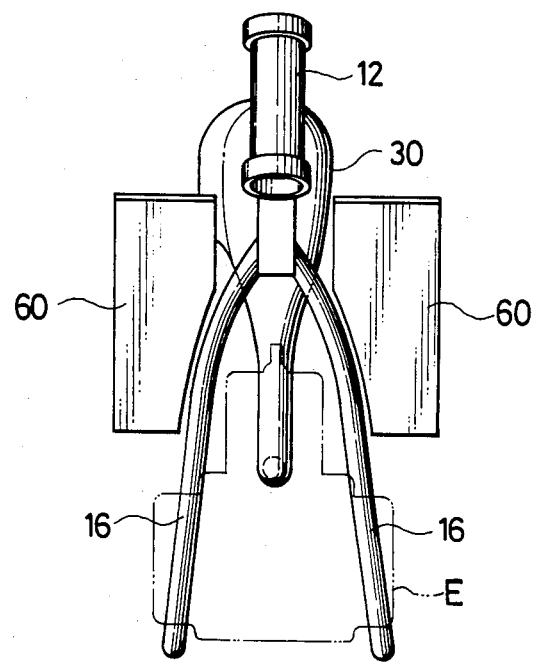
FIG. 5 is a schematic view of an essential part of the same motorcycle taken along line V—V in FIG. 4 as viewed in the direction of arrows.
Figure 6:
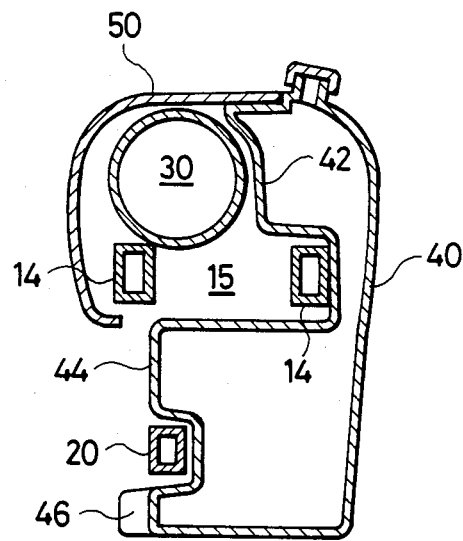
FIG. 6 is a schematic partial cross-section view taken along line VI—VI in FIG. 4 as viewed in the direction of arrows.
Figure 7:
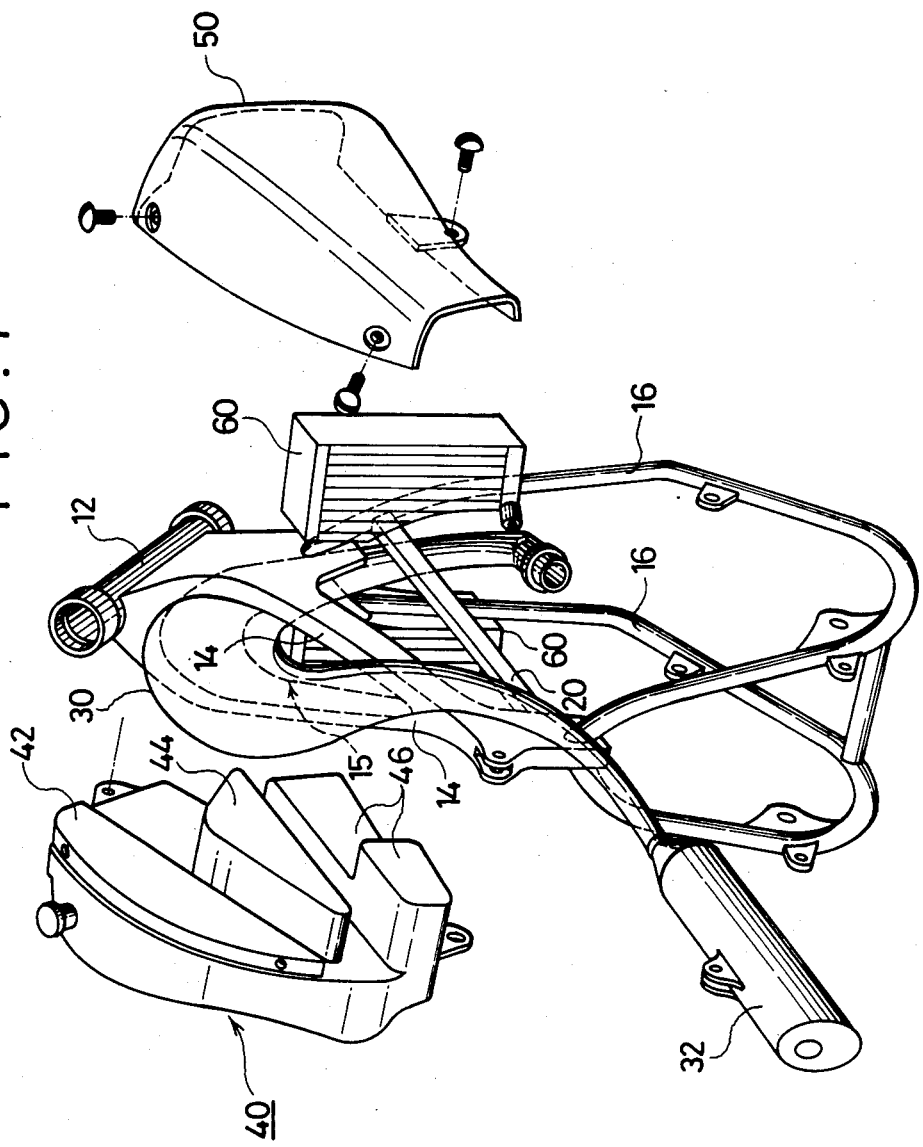
FIG. 7 is an disintegrated perspective view of an essential part of the same motorcycle.

FIG. 4 shows schematically a motorcycle 10 loaded with a two-cycle engine E, and a body frame of the motorcycle is of double-cradle shape, and is composed of a head pipe 12, a main frame 14 having such configuration that it is connected at its front end to the head pipe 12 and after it is once branched to the left and the right the branched portions are integrated at their rear ends. A pair of left and right down tubes 16 having their top ends connected to the main frame 14 and extend downwards in front of the engine E. A pair of left and right center pillars 18 having their top ends connected to the rear and portion of the main frme 14 and extend downwards behind the engine E. A cross pipe 20 connects the right side down tube 16 with the rear end portion of the main frame 14. A pair of left and right seat rails 22 connected to the rear end portion of the main frame 14 and extending backwards and are supported by a pair of left and right back stays 24.

In addition, an exhaust pipe 30 connected to an exhaust port of the engine E extends upwards between the down tubes 16, 16 and between radiators 60, 60 attached to the respective down tubes and into a space portion 15 delimited by the outwardly convexing left and right branch portions of the main frame 14. After reaching a level higher than the main frame 14 exhaust pipe 30 extends downwards on the right side (as viewed from a rider) of the rear end portion of the main frame 14 and further extends backwards along the seat rail 22, and is connected to the muffler 32 (See FIGS. 4 and 7).

In order to adapt to the above-mentioned special configuration and arrangement of the exhaust pipe 30, the configuration of a fuel tank 40 is also different from that of the conventional fuel tank. Fuel tank 40 has such configuration that it can be mounted to the body frame from the left side (as viewed from a rider) of the body. The right wall of the fuel tank 40 located close to the center of the body is formed in a complexly recessed and protruded shape consisting of a first protruded wall 42 FIG. 6 positioned above the main frame 14, a second protruded wall 44 positioned below the main frame 14 and above the cross pipe 20, a third protruded wall 46 positioned below the cross pipe 20 and recessed walls positioned between the protruded walls (See FIGS. 6 and 7). Since the first protruded wall 42 of the fuel tank 40 is opposed to the exhaust pipe 30, it is preferable to coat the surface of the first protruded wall 42 with a heat-insulating material or to dispose a separate heat-insulating wall between the first protruded wall 42 and the exhaust pipe 30.

Furthermore, a cover formed by coating an inner surface of a synthetic resin plate with a heat-insulating material such as asbestos is disposed with its upper side edge portion connected to the fuel tank 40 so as to cover the upper surface and the right side surface of the exhaust pipe 30 and the right side surface of the main frame 14. This cover 50 is formed in a plane-symmetric shape to the left wall (as viewed from a rider) of the fuel tank 40, and also the surface of the cover 50 is made smooth similarly to that of the fuel tank 40. This is done for the purpose of assuring smoothly slidable contact of rider's legs with the cover 50 and the fuel tank 40.

The motorcycle 10 is constructed in the above-described manner, and has been made possible by designing the fuel tank 40 in the special configuration such that it can be mounted to the vehicle body frame in the lateral direction, to make the exhaust pipe 30 extend from the exhaust port of the engine E directly upwards and further extend upwards as penetrating through the space portion 15 of the branched main frame 14.

In addition, it has been also made possible by employing the structure such that the fuel tank 40 is mounted to and dismounted from the vehicle body frame in the lateral direction, to assure a sufficient fuel tank capacity by making the fuel tank 40 suspend largely downwards and making the second protruded wall 44 and the third protruded wall 46 project largely up to the position of the cross pipe 20. Moreover, by adapting such mounting/dismounting type of the fuel tank 40, good vehicle maintenance facility can be assured.

The other advantages obtained by the above-described embodiment of the present invention are as follows:

(1) Since the exhaust pipe 30 extends straightly upwards from the exhaust port of the engine E, muddy water splashed by the front wheel would hardly adhere thereto.

(2) As the radiators 60, 60 are positioned on the left and right sides, respectively, of the exhaust pipe 30, the mounting positions along the vertical directions as well as the dimensions of the vertical direction of the radiators 60, 60 can be selectively determined with a large freedom.

(3) Owing to the fact that the large diameter portion of the exhaust pipe 30 is positioned nearly at the center of the widthwise direction of the vehicle body the exhaust pipe 30 can be arbitrarily disposed without being influenced by the foot rest attitude of a rider.

Now, modified embodiments of the present invention illustrated in FIGS. 8 and 9, respectively, will be described.

Figure 8:
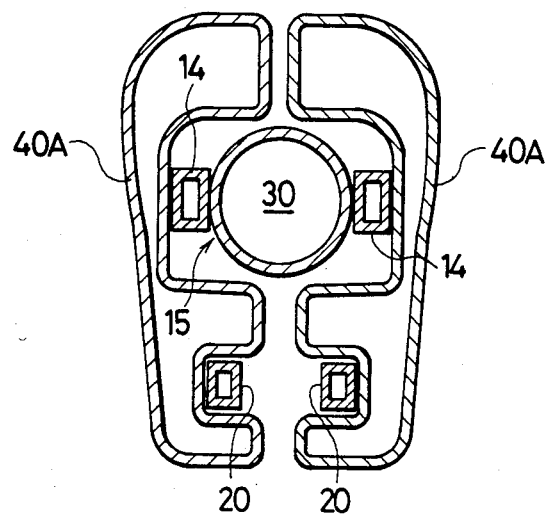
FIGS. 8 and 9 are schematic partial cross-section views similar to FIG. 6 respectively showing layout of an exhaust pipe in motorcycles according to different modified embodiments of the present invention.
Figure 9:
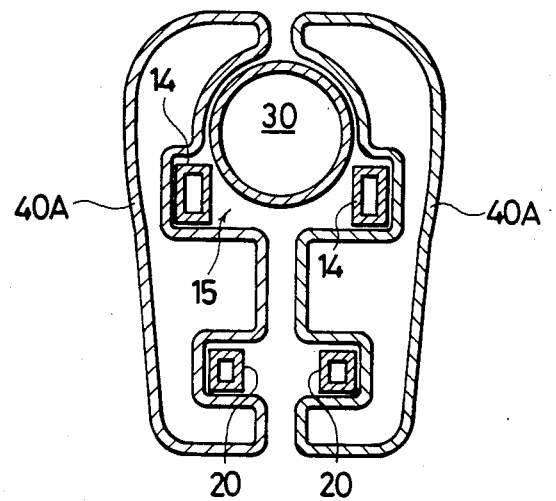

In the first modified embodiment shown in FIG. 8, the exhaust pipe 30 is positioned within the space delimited by the main frame 14, and fuel tank sections 40A, 40A of a laterally divided fuel tank are shaped so as to embrace the space 15 including the exhaust pipe 30 and the main frame 14 and also to embrace left and right cross pipes 20, respectively. In the second modified embodiment shown in FIG. 9, the exhaust pipe 30 is positioned at the center in the widthwise direction of the vehicle body at a level higher than the main frame 14, and fuel tank sections 40A, 40A of a laterally divided fuel tank are shaped so as to embrace the exhaust pipe 30 and the main frame 14 and also to embrace left and right cross pipes 20, respectively.

As will be apparent from the above description, in the motorcycle according to the present invention, owing to the fact that a fuel tank is mounted to a main frame extending from a head pipe to the rear of a vehicle body in such mode that the fuel tank can be mounted from and dismounted to the side of the vehicle body and an exhaust pipe is disposed along the main frame at the same level as the fuel tank, a freedom in design of an exhaust pipe is increased without deteriorating a workability for mounting and dismounting the fuel tank upon maintenance of the vehicle, layout of the exhaust pipe not influenced by the foot rest attitude becomes possible, and therefore, comfortable running of the vehicle can be expected.

What is claimed is:

1. A motorcycle comprising a main frame and cross pipes extending from a head pipe toward the rear of a vehicle body, a fuel tank mounted to said main frame in such mode that said fuel tank can be mounted to and dismounted from the side of said vehicle body, and an exhaust pipe disposed along said main frame at the same level as said fuel tank, said exhaust pipe having an upper portion positioned on a longitudinal vertical center plane of said motorcycle, said fuel tank being divided into left and right fuel tank sections mounted to said main frame from the left and right sides, respectively, of said vehicle body, and the opposed inside walls of said respective fuel tank sections are recessed and protruded so as to embrace said exhaust pipe disposed along said main frame, said main frame and said cross pipes therebetween.

* * * * *